United States Patent
Johnson

(10) Patent No.: US 7,929,647 B2
(45) Date of Patent: Apr. 19, 2011

(54) EMITTER PULSE DETECTION UTILIZING ADAPTIVE MATCHED FILTER APPROACH

(75) Inventor: J. Andrew Johnson, Newark Valley, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1076 days.

(21) Appl. No.: 11/374,594

(22) Filed: Mar. 13, 2006

(65) Prior Publication Data
US 2007/0211834 A1    Sep. 13, 2007

(51) Int. Cl.
H04L 27/06    (2006.01)
(52) U.S. Cl. ........ 375/343; 375/142; 375/143; 375/150; 375/152; 375/316; 375/340
(58) Field of Classification Search ................ 375/340, 375/343, 142, 143, 150, 152, 316
See application file for complete search history.

(56) References Cited

U.S. PATENT DOCUMENTS

| | | | |
|---|---|---|---|
| 3,614,626 A | 10/1971 | Dillard | |
| 4,718,028 A | 1/1988 | Gussin et al. | |
| 4,879,561 A | 11/1989 | Inkol | |
| 5,568,519 A | 10/1996 | Baier et al. | |
| 5,574,639 A * | 11/1996 | Qian et al. | 708/300 |
| 5,867,118 A | 2/1999 | McCoy et al. | |
| 5,910,905 A * | 6/1999 | Qian et al. | 708/311 |
| 6,222,481 B1 | 4/2001 | Abrahamson et al. | |
| 6,393,077 B1 * | 5/2002 | Usui | 375/343 |
| 6,564,176 B2 | 5/2003 | Kadtke et al. | |
| 6,622,118 B1 | 9/2003 | Crooks et al. | |
| 6,727,842 B1 | 4/2004 | Schleder et al. | |
| 6,771,723 B1 | 8/2004 | Davis et al. | |
| 6,980,613 B2 * | 12/2005 | Krivokapic | 375/346 |
| 7,020,224 B2 * | 3/2006 | Krivokapic | 375/343 |
| 7,194,019 B2 * | 3/2007 | Dowla et al. | 375/147 |
| 2003/0133496 A1 * | 7/2003 | Hooton | 375/139 |

OTHER PUBLICATIONS

U.S. Patent Appln. Publication US2001/0049590A1, published Dec. 6, 2001.
U.S. Patent Appln. Publication US2004/0113831A1, published Jun. 17, 2004.
U.S. Patent Appln. Publication US2004/0113832A1, published Jun. 17, 2004.

* cited by examiner

Primary Examiner — David C Payne
Assistant Examiner — Leon Flores
(74) Attorney, Agent, or Firm — Tarolli, Sundheim, Covell & Tummino LLP

(57) ABSTRACT

Systems and methods are provided for dynamically analyzing radar pulses at a receiver. A digital signal is provided to an amplitude detector. At least one digital waveform representing an emitter pulse is identified at the amplitude detector. A matched filter associated with the emitter is generated, comprising at least one characteristic of the identified digital waveform.

21 Claims, 3 Drawing Sheets

EMITTER PULSE DETECTION UTILIZING ADAPTIVE MATCHED FILTER APPROACH

BACKGROUND OF THE INVENTION

1. Technical Field

The invention relates generally to electronic support measures and, more specifically, to systems and methods for the detection of emitter pulses.

2. Description of the Prior Art

Determining the location of emitters of electromagnetic ("EM") radiation in a monitored area, especially multiple emitters in an area, is a matter of interest in many applications, such as military or security applications. In one such application, it is desirable to determine the location of EM emitters in a monitored geographic area. Known methods for determining the location of EM emitters involve collecting electromagnetic radiation data simultaneously at one or more EM receiver platform sites having known locations in the monitored area. The EM data collected at the EM receiver platforms may be filtered in order to isolate a particular frequency range of interest.

Once the EM data is collected, it is necessary to separate pulses associated with the EM emitters from background noise associated with the system. For example, the amplitude of the collected EM data can be monitored for activity indicative of a pulse. When the amplitude exceeds a threshold, pulse parameters (e.g., frequency, amplitude, and phase) can be measured until the amplitude of the collected data falls below the threshold level. Accordingly, information associated with pulses from EM emitters can be lost in the background noise collected at the receiver platform.

SUMMARY OF THE INVENTION

In accordance with one aspect of the present invention, a method is provided for dynamically analyzing radar pulses at a receiver. A digital signal is provided to an amplitude detector. At least one digital waveform representing an emitter pulse is identified at the amplitude detector. A matched filter associated with the emitter is generated, comprising at least one characteristic of the identified digital waveform.

In accordance with another aspect of the present invention, a system is provided for dynamically analyzing radar pulses. At least one matched filter is operative to identify digital waveforms within a digital signal that represents a pulse emitted from an emitter associated with the matched filter according to at least one associated waveform template. An amplitude detector identifies a digital waveform within the digital signal representing an emitter pulse according to an associated amplitude of the pulse. A template generator creates a new matched filter having a new waveform template comprising at least one characteristic of the digital waveform identified at the amplitude detection component.

In accordance with yet another aspect of the invention, a computer readable medium is provided for dynamically analyzing radar pulses. At least one matched filter is operative to identify digital waveforms within a digital signal that represents a pulse emitted from an emitter associated with the matched filter according to at least one associated waveform template. An amplitude detector identifies a digital waveform within the digital signal representing an emitter pulse according to an associated amplitude of the pulse. A template generator creates a new matched filter having a new waveform template comprising at least one characteristic of the digital waveform identified at the amplitude detection component.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

In accordance with an aspect of the present invention, methods and systems for identifying emitter pulses are provided. The methods and systems can be applied to any of a number of applications in which it is desirable to detect an emitter pulse, such as the detection and location of radar emissions. A pulse detection system in accordance with one aspect of the present invention includes a plurality of matched filters that detect portions of the digital signal that match associated templates. An amplitude-based pulse detector detects pulses that do not match one of the associated templates. The detected pulses at the amplitude-based pulse detector can be utilized to create additional matched filters.

Figure 1:
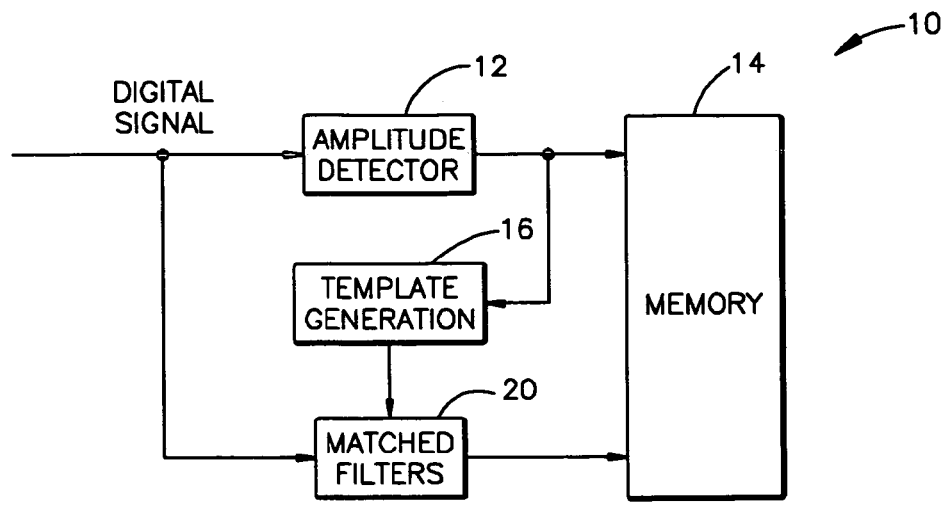
FIG. 1 illustrates a pulse detection system for an electronic support measures (ESM) system in accordance with an aspect of the present invention.

FIG. 1 illustrates a pulse detection system 10 for an electronic support measures (ESM) system in accordance with an aspect of the present invention. The pulse detection system 10 detects and characterizes radar pulses detected by the system to determine properties of one or more pulse emitters that are producing the pulses. For example, these properties can include the location of the emitter, an associated base clock period and offset, and an associated clock drift factor.

It will be appreciated that the illustrated system 10 can be implemented as one or more computer programs, executable on one or more general purpose data processors. Accordingly, any structures herein described can be implemented alternately as dedicated hardware circuitry for the described function or as a program code stored as part of a computer-assessable memory, such as a computer hard drive, random access memory, or a removable disk medium (e.g., magnetic storage media, flash media, CD and DVD media, etc.). Some functions carried out by the illustrated system that are not helpful in understanding the claimed invention may be omitted from this diagram.

It will further be appreciated that the illustrated system can be implemented in any appropriate environment for an electronic support measures system, including both stationary and mobile platforms. Accordingly, the present invention can be implemented on aircraft, watercraft, ground vehicles and installations, and spacecraft to detect RF emissions having suitable characteristics (e.g., stable period and repeating pulse patterns).

In accordance with an aspect of the present invention, a digital signal is received at an amplitude detector 12. The amplitude detector 12 evaluates the incoming signal stream to detect digital samples of sufficient amplitude as to represent the rising edge of a radar pulse. When a pulse is detected, a digital waveform is extracted from the digital signal and saved in a memory 14.

The extracted waveform is also provided to a template generator 16. The template generator 16 produces a waveform template, representing the waveform and its associated emitter, that is suitable for use in a matched filter. The template generator 16 can also determine one or more characteristics of the digital waveform for inclusion in the matched filter. The newly generated matched filter can be added to a bank of matched filters 20 associated with the system. Subsequent waveforms can be provided to the bank of matched filters 20 as well as the amplitude detector 12 for analysis.

During operation, the digital signal is provided to the bank of matched filters 20 as well as the pulse detector 12. Each matched filter within the bank of match filters 20 evaluates portions of the digital signal to find additional waveforms representing pulses from an associated emitter. When a match is determined, the matching portion of the digital signal is extracted and saved to memory as a waveform part of a pulse group associated with the matched filters. Characteristics of an emitter represented by a given pulse group can be determined from an analysis of a plurality of waveforms comprising the pulse group.

Figure 2:
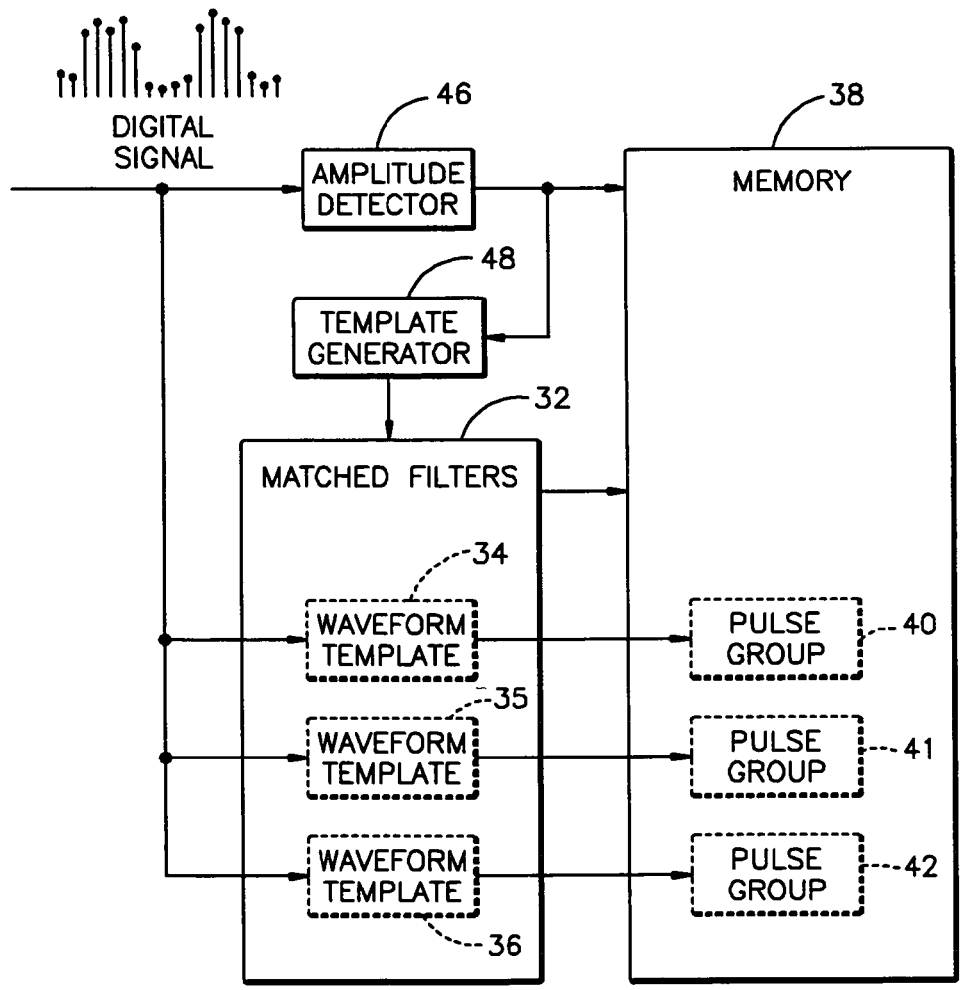
FIG. 2 illustrates an exemplary embodiment of a pulse detection system in accordance with an aspect of the present invention.

FIG. 2 illustrates an exemplary embodiment of a pulse detection system 30 in accordance with an aspect of the present invention. The system utilizes at least one matched filter to extract emitter pulses from a digital signal. In accordance with an aspect of the present invention, input waveforms can be extracted from the digital signal and provided to a bank of matched filters 32 for comparison to a plurality of stored waveform templates 34-36. For example, numerical values for each of a plurality of characteristics of interest can be determined from the input waveform and compared to the existing templates.

It will be appreciated that at least one of the characteristics of interest can comprise the amplitude and/or phase of a plurality of digital samples comprising the digital waveform, such that the digitized waveform itself can provide some or all of the numerical values for comparison. Other possible characteristics of interest can include the width of the pulse (e.g., the number of digital samples exceeding a threshold amplitude) and one or more parameters derived from the phase and amplitude values (e.g., phase difference and amplitude differences between neighboring samples).

In an exemplary implementation, the amplitude and phase values of the digital samples comprising the input waveform are compared to the plurality of waveform templates 34-36. For each template, a correlation value is calculated from the numerical values as follows:

$$\rho(k) = \frac{\sum_{l=0}^{L-1} h(l)x(k-L+l)}{\sqrt{\sum_{l=0}^{L-1} h(l)h^*(l) \sum_{l=0}^{L-1} x(k-L+l)x^*(k-L+l)}}$$

where ρ(k) is the correlation coefficient for a series of digital samples in a digital signal ending at a sample k, L is a number of samples in a waveform template, h(l) is a complex value representing an $l^{th}$ digital sample associated with the template, x(k−L+l) is a complex value representing a (k−L+l)$^{th}$ digital sample in a series of digital samples, and F*(y) represents the complex conjugate of a function, F(y).

For each waveform template 34-36, an absolute value of the calculated correlation coefficient can be compared to a threshold value to determine if the selected portion of the digital signal resembles the waveform template sufficiently as to be considered a pulse from the emitter associated with the template. If so, the pulse can be stored in a system memory 38 in one of a plurality of pulse groups 40-42 corresponding to the plurality of waveform templates 34-36. Each pulse group 40-42 contains at least one waveform representing the emitter associated with its corresponding waveform template. It will be appreciated that a pulse repeat interval associated with the pulse group can be inferred by the difference between values of k when a sample is identified as belonging to the pulse group.

In accordance with an aspect of the present invention, the matched filters 32 can be utilized to detect frequency agile emitters. For example, a given template (e.g., 34) can be shifted in frequency (e.g., digital heterodyning) to generate a new template or adapt the template as to allow pulses provided by a frequency agile emitter to be detected at the matched filters 32. It will be appreciated that knowledge of a frequency spacing associated with the frequency agile emitter is helpful in determining an appropriate frequency shift for the template.

The matched filters 32 can be updated to include additional waveform templates. To this end, the digital signal can also be provided to an amplitude detector 46 that monitors the digital signal for digital samples exceeding a threshold amplitude. When the digital signal exceeds a threshold amplitude, a portion of the signal is extracted for analysis. For example, a series of digital samples can be extracted as a digital waveform until the amplitude of the digital signal drops below the threshold level, or alternatively, until the amplitude of the digital signal drops below a second threshold, which, for example, can be a function of a peak amplitude associated with the series of digital samples.

The extracted digital waveform is stored in memory 38 as the beginning of a new pulse group and provided to a template generator 48 that produces a waveform template comprising one or more characteristics of the extracted waveform. For example, the characteristics can include a pulse width or one or more difference values based on the phase and amplitude values of the digital samples associated with the extracted waveform. Alternatively, the waveform template can comprise the extracted waveform itself, and the template generator 48 can be limited to a formatting function. Once generated, the waveform template can be provided to the template matching component 32.

In the illustrated example, the template generator 48 can be operative to update a given waveform template in response to newly identified pulses associated with the template. When a new pulse is added to the pulse group associated with the waveform template, a new template can be formed from the pulses comprising the pulse group. For example, the template can comprise a sample-by-sample averaging of the plurality of pulses comprising the pulse group. Alternatively, an objective measure of the quality of the template (e.g., signal to noise ratio) can be used to identify a best pulse from the plurality of pulses comprising the pulse group, and the identified best pulse can be used to generate the new template.

Figure 3:
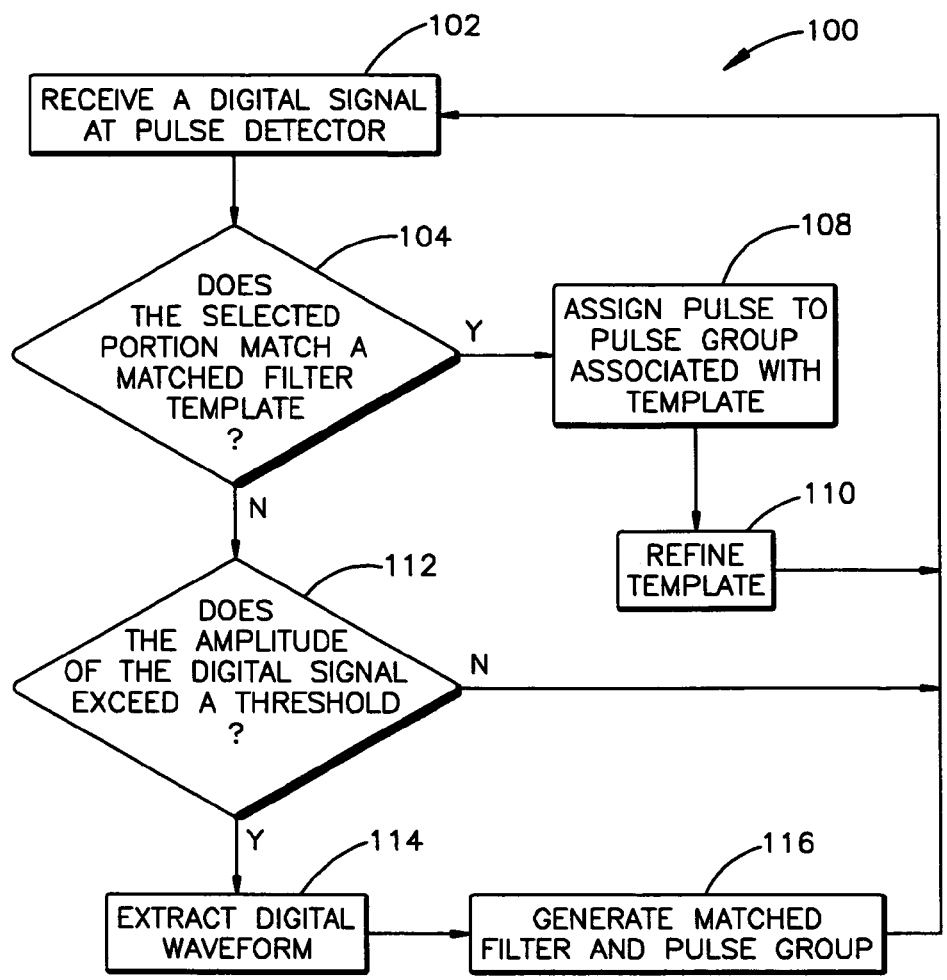
FIG. 3 illustrates a methodology for detecting and characterizing emitter pulses at a receiver apparatus in accordance with an aspect of the present invention.

FIG. 3 illustrates a methodology step 100 for detecting and characterizing emitter pulses at a receiver apparatus. The methodology begins at step 102, where a portion of a digital signal is provided to a pulse detection system associated with the receiver. At step 104, a portion of the digital signal is evaluated at a plurality of matched filters to determine if the evaluated portion resembles a pulse template associated with a previously detected emitter. It will be appreciated that the respective portions of the digital signal evaluated by the matched filters can be of different sizes and comprise a differing one or more series of digital samples for each matched filter.

In accordance with an aspect of the present invention, for each of a plurality of matched filters, a plurality of characteristics of the selected portion of the digital signal can be determined and compared to a set of associated characteristics in the matched filter. In an exemplary implementation, the characteristics include a series of complex values representing the phase and amplitude of the digital signal at a series of sample times. The characteristics care compared to determine a similarity measure (e.g., a correlation coefficient, summed squared error, etc.).

If a portion of the digital signal is determined to match an existing pulse template (Y), the methodology 100 advances to step 108, where the portion of the digital signal is added as a new pulse to a pulse group associated with the pulse template. It will be appreciated each template and its corresponding pulse group can represent a different emitter of interest. At step 110, the pulse template is refined according to the newly detected pulse. A new template can be formed from the digital waveforms comprising the pulse group. For example, the template can comprise a sample-by-sample averaging of the plurality of waveforms comprising the pulse group. The methodology 100 then returns to step 102 to evaluate a new portion of the digital signal.

If the selected portions of the digital signal is determined to match an existing pulse template (N), the amplitude of the digital signal is compared to a threshold amplitude. For example, the amplitude of one or more of the most recent digital samples can be compared to the threshold to determine if they may represent a rising edge of an emitter pulse. If the digital signal does not meet the threshold (N), the methodology 100 returns to step 102 to evaluate a new portion of the digital signal.

If the digital signal exceeds the threshold (Y), the methodology advances to step 114 where a digital waveform, representing an emitter pulse, is extracted from the digital signal. For example, the digital waveform can comprise a series of digital samples that exceed the threshold, a series of a predetermined number of digital samples following an initial digital sample exceeding the threshold, or a series of digital samples exceeding a second threshold that follow an initial sample that exceeds the first threshold. A new pulse group and matched filter, having an associated waveform template, can be derived from the extracted waveform at step 116. In an exemplary implementation, the waveform template comprises the series of amplitude and phase values comprising the digital waveform, although it will be appreciated that other parameters extracted from the digital waveform can be utilized in the template. Once the new matched filter is established, the methodology 100 returns to step 102 to evaluate a new portion of the digital signal.

Figure 4:
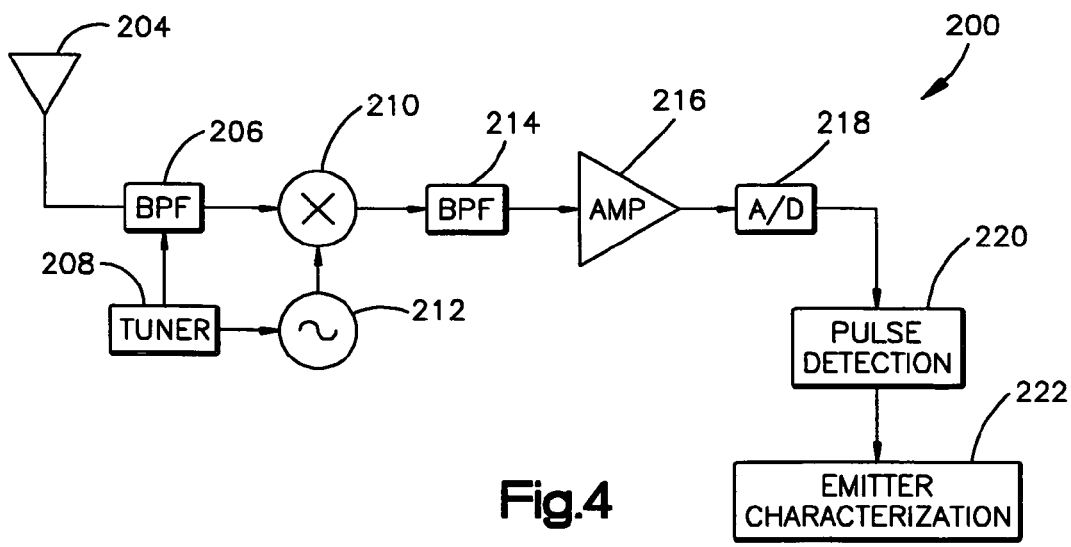
FIG. 4 illustrates an exemplary electronic support measures system incorporating a plurality of matched filters as part of a pulse detection system in accordance with an aspect of the present invention.

FIG. 4 illustrates an exemplary radar system 200 incorporating a plurality of matched filters as part of a pulse detection system 202 in accordance with an aspect of the present invention. A radio frequency (RF) signal, containing the outputs of one or more emitters and background noise, is received at an antenna 204 and provided to a tunable bandpass filter 206, controlled by a tuner 208. The tuner 208 can be operative to vary a passband associated with the bandpass filter 206 across a plurality of frequency ranges to detect signals associated with one or more emitters of interest.

The filtered RF signal is provided to a mixer 210 where the signal is demodulated to an intermediate frequency. A local oscillator 212, responsive to the tuner 208, is utilized in demodulating the signal. The demodulated signal is provided to a bandpass filter 214 and then to an amplifier 216, that amplifies the demodulated signal to an appropriate level for processing. The amplified signal is then provided to an analog-to-digital converter 218 that converts the amplified signal into a digital signal.

The digital signal is provided to a pulse detection component 220 in accordance with an aspect of the present invention. The pulse detection component 220 includes a plurality of matched filters, operative to detect portions of the digital signal that match associated templates. An amplitude-based pulse detector is operative to detect pulses that do not match one of the associated templates. The detected pulses at the amplitude-based pulse detector can be utilized to create additional matched filters.

The pulses comprising each pulse group can be provided to an emitter characterization component 222. The emitter characterization component 222 evaluates the determined pulse groups to determine one or more characteristics of the emitter associated with each pulse group. For example, a base clock period associated with the emitter and a location of the emitter can be determined from the clock pulses comprising the group and their respective times of arrival. It will be appreciated that other characteristics of the emitter can also be determined from the pulses comprising each group.

Figure 5:
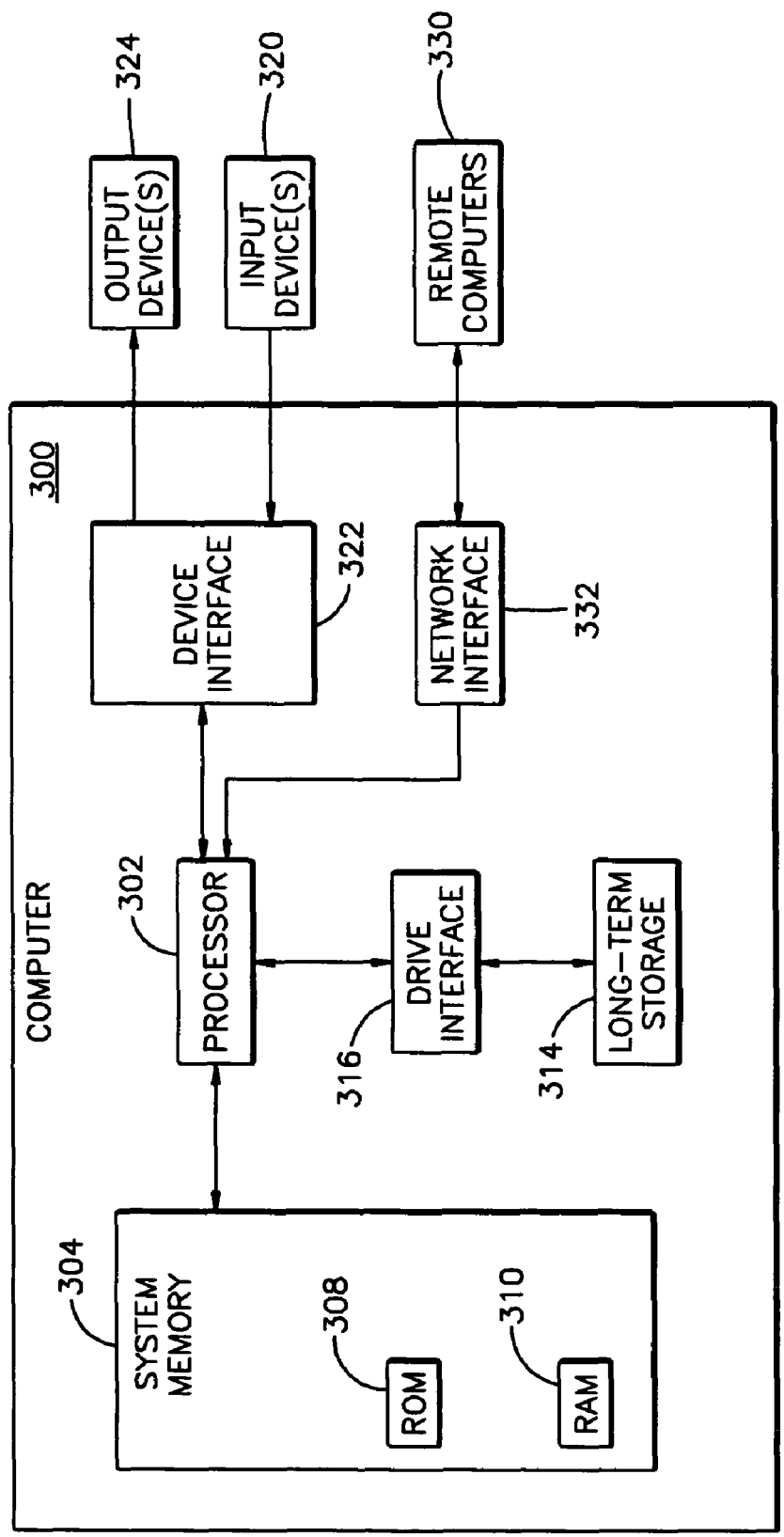
FIG. 5 illustrates a computer system that can be employed to implement systems and methods described herein, such as based on computer executable instructions running on the computer system.

FIG. 5 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. Dual microprocessors and other multi-processor architectures can also be utilized as the processor 302. The processor 302 and system memory 304 can be coupled by any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) can reside in the ROM 308, generally containing the basic routines that help to transfer information between elements within the computer system 300, such as a reset or power-up.

The computer system 300 can include one or more types of long-term data storage 314, including a hard disk drive, a magnetic disk drive, (e.g., to read from or write to a removable disk), and an optical disk drive, (e.g., for reading a CD-ROM or DVD disk or to read from or write to other optical media). The long-term data storage can be connected to the processor 302 by a drive interface 316. The long-term storage components 314 provide nonvolatile storage of data, data structures, and computer-executable instructions for the computer system 300. A number of program modules may also be stored in one or more of the drives as well as in the RAM 310, including an operating system, one or more application programs, other program modules, and program data.

A user may enter commands and information into the computer system 300 through one or more input devices 320, such as a keyboard or a pointing device (e.g., a mouse). These and other input devices are often connected to the processor 302 through a device interface 322. For example, the input devices can be connected to the system bus 306 by one or more a parallel port, a serial port or a universal serial bus (USB). One or more output device(s) 324, such as a visual display device or printer, can also be connected to the processor 302 via the device interface 322.

The computer system 300 may operate in a networked environment using logical connections (e.g., a local area network (LAN) or wide area network (WAN) to one or more remote computers 330. The remote computer 330 may be a workstation, a computer system, a router, a peer device or other common network node, and typically includes many or all of the elements described relative to the computer system 300. The computer system 300 can communicate with the remote computers 330 via a network interface 332, such as a wired or wireless network interface card or modem. In a networked environment, application programs and program data depicted relative to the computer system 300, or portions thereof, may be stored in memory associated with the remote computers 330.

Having described the invention, the following is claimed:

1. A method for dynamically analyzing radar pulses at a receiver, comprising:
    comparing received signals to each of a plurality of stored matched filters;
    providing a digital signal to an amplitude detector in response to a determination that the received signal does not match one of the plurality of stored matched filters;
    identifying at least one digital waveform representing an emitter pulse associated with an emitter at the amplitude detector; and
    generating a matched filter associated with the emitter, comprising at least one characteristic of the identified digital waveform, when the received signal does not match one of the plurality of stored matched filters.

2. The method of claim 1, further comprising:
    providing the digital signal to the generated matched filter; and
    identifying portions of the digital signal representing pulses from the emitter associated with the matched filter according to the at least one characteristic associated with the matched filter.

3. The method of claim 2, further comprising updating the generated matched filter according to the identified portions of the digital signal.

4. The method of claim 2, wherein the at least one characteristic includes an associated phase and amplitude of each of a plurality of digital samples comprising a digital waveform associated with the generated matched filter.

5. The method of claim 2, wherein the at least one characteristic includes an associated pulse width of a digital waveform associated with the generated matched filter.

6. The method of claim 2, wherein identifying portions of the digital signal representing pulses from the emitter comprises computing a correlation coefficient between a first plurality of numerical values representing the at least one characteristic associated with the generated matched filter and a corresponding second plurality of numerical values for the at least one characteristic determined from a portion of the digital signal.

7. The method of claim 6, wherein the first plurality of numerical values comprise a plurality of complex values representing the phase and amplitude of a plurality of digital samples associated with the generated matched filter and the second plurality of numerical values comprise a plurality of complex values representing the phase and amplitude of a plurality of digital samples associated with the portion of the digital signal.

8. The method of claim 1, wherein identifying at least one digital waveform includes identifying a digital sample having an amplitude exceeding a threshold amplitude and selecting a plurality of subsequent digital samples in the digital stream according to their associated amplitudes.

9. The method of claim 1, further comprising shifting an associated frequency of a waveform template associated with the generated matched filter from a first frequency to a second frequency, such that the generated matched filter is responsive to emitter pulses of the second frequency.

10. A pulse detection system, comprising:
    a plurality of stored matched filters configured to identify digital waveforms within a digital signal that represent a pulse emitted from an emitter associated with the matched filter according to respective sets of at least one associated waveform template;
    an amplitude detector configured to identify a digital waveform within the digital signal representing an emitter pulse according to an associated amplitude of the pulse; and
    a template generator configured to create a new matched filter having a new waveform template comprising at least one characteristic of the digital waveform identified at the amplitude detection component when the digital waveforms within the digital signal are not represented by one of the plurality of stored matched filters.

11. The system of claim 10, where the template generator is operative to update a waveform template from the at least one waveform template associated with one of the plurality of matched filters in response to a digital waveform identified at the matched filter.

12. The system of claim 11, where the updated waveform template comprises an average of a plurality of digital waveforms associated with matched filter.

13. The system of claim 10, where the at least one characteristic includes an associated phase and amplitude of each of a plurality of digital samples comprising the digital waveform identified at the amplitude detection component.

14. The system of claim 10, wherein each of the plurality of matched filters is operative to computer a correlation coefficient between a first plurality of numerical values associated with a portion of the digital signal and a second plurality of numerical values associated with a waveform template from the at least one waveform template.

15. The system of claim 14, wherein the first plurality of numerical values comprise a plurality of complex values representing the phase and amplitude of a plurality of digital samples associated with the portion of the digital signal and the second plurality of numerical values comprise a plurality of complex values representing the phase and amplitude of a plurality of digital samples associated with the waveform template.

16. An electronic support measure system comprising the pulse detection system of claim 10.

17. The electronic support measures system of claim 16, further comprising an emitter characterization component that determines the properties of at least one pulse emitter according to a plurality of digital waveforms identified at the at least one matched filter.

18. The electronic support measures system of claim 16, wherein the electronic support measures system is implemented on an aircraft.

19. A computer readable (non-transitory) medium storing a computer executable program, the computer executable program, when executed in a general purpose computer, providing:

- a plurality of matched filters configured to identify digital waveforms within a digital signal that represent a pulse emitted from an emitter associated with the matched filter according to respective sets of at least one associated waveform template;
- an amplitude detector configured to identify a digital waveform within the digital signal representing an emitter pulse according to an associated amplitude of the pulse; and
- a template generator configured to create a new matched filter having a new waveform template comprising at least one characteristic of the digital waveform identified at the amplitude detection component when the digital waveforms within the digital signal are not represented by one of the plurality of stored matched filters.

20. The computer readable (non-transitory) medium of claim 19, where the template generator is operative to update a waveform template from the at least one waveform template associated with one of the plurality of matched filters in response to a digital waveform identified at the matched filter.

21. The computer readable (non-transitory) medium of claim 19, where the at least one characteristic includes an associated phase and amplitude of each of a plurality of digital samples comprising the digital waveform identified at the amplitude detection component.

* * * * *